(12) United States Patent
Kothari et al.

(10) Patent No.: US 11,705,127 B2
(45) Date of Patent: *Jul. 18, 2023

(54) SIGNAL PROCESSING COORDINATION AMONG DIGITAL VOICE ASSISTANT COMPUTING DEVICES

(71) Applicant: Google LLC, Mountain View, CA (US)

(72) Inventors: Anshul Kothari, Cupertino, CA (US); Gaurav Bhaya, Sunnyvale, CA (US); Tarun Jain, Los Altos, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/346,009

(22) Filed: Jun. 11, 2021

(65) Prior Publication Data

US 2021/0304761 A1 Sep. 30, 2021

Related U.S. Application Data

(63) Continuation of application No. 15/764,907, filed as application No. PCT/US2017/065462 on Dec. 8, 2017, now Pat. No. 11,037,555.

(51) Int. Cl.
*G10L 15/22* (2006.01)
*G10L 15/28* (2013.01)
(Continued)

(52) U.S. Cl.
CPC ............ *G10L 15/22* (2013.01); *G10L 15/28* (2013.01); *H04L 43/10* (2013.01); *H04L 67/125* (2013.01); *G10L 2015/223* (2013.01)

(58) Field of Classification Search
USPC ............... 704/231, 246, 247, 251, 252, 275
See application file for complete search history.

(56) References Cited

U.S. PATENT DOCUMENTS 9,749,583 B1 8/2017 Fineberg et al.
9,848,075 B1 * 12/2017 Ahmad ............... A61B 5/0022
(Continued)

FOREIGN PATENT DOCUMENTS

CN 106448658 2/2017
CN 106469040 3/2017
(Continued)

OTHER PUBLICATIONS

Examination Report for EP Appln. Ser. No. 17826346.3 dated Jul. 1, 2021 (5 pages).
(Continued)

*Primary Examiner* — Leonard Saint-Cyr
(74) *Attorney, Agent, or Firm* — Dority & Manning, P.A.

(57) ABSTRACT

Coordinating signal processing among computing devices in a voice-driven computing environment is provided. A first and second digital assistant can detect an input audio signal, perform a signal quality check, and provide indications that the first and second digital assistants are operational to process the input audio signal. A system can select the first digital assistant for further processing. The system can receive, from the first digital assistant, data packets including a command. The system can generate, for a network connected device selected from a plurality of network connected devices, an action data structure based on the data packets, and transmit the action data structure to the selected network connected device.

20 Claims, 4 Drawing Sheets

(51) Int. Cl.
H04L 43/10 (2022.01)
H04L 67/125 (2022.01)

(56) References Cited

U.S. PATENT DOCUMENTS

| | | | |
|---|---|---|---|
| 2006/0085183 | A1 | 4/2006 | Jain |
| 2010/0232618 | A1 | 9/2010 | Haartsen et al. |
| 2013/0170658 | A1 | 7/2013 | Fujisawa et al. |
| 2014/0081633 | A1 | 3/2014 | Badaskar |
| 2014/0222436 | A1 | 8/2014 | Binder et al. |
| 2014/0310002 | A1 | 10/2014 | Nitz et al. |
| 2014/0372109 | A1 | 12/2014 | Iyer |
| 2015/0100167 | A1 | 4/2015 | Sloo et al. |
| 2015/0195649 | A1 | 7/2015 | Vogt |
| 2015/0221307 | A1 | 8/2015 | Shah et al. |
| 2016/0049147 | A1 | 2/2016 | Anderson |
| 2016/0071399 | A1 | 3/2016 | Altman et al. |
| 2016/0119736 | A1 | 4/2016 | Fujisawa et al. |
| 2016/0314782 | A1 | 10/2016 | Klimanis |
| 2016/0337795 | A1 | 11/2016 | Nachman et al. |
| 2016/0360018 | A1 | 12/2016 | Watson et al. |
| 2016/0373899 | A1 | 12/2016 | Celinski et al. |
| 2017/0025124 | A1 | 1/2017 | Mixter et al. |
| 2017/0068507 | A1 | 3/2017 | Kim et al. |
| 2017/0083285 | A1 | 3/2017 | Meyers et al. |
| 2017/0090864 | A1 | 3/2017 | Jorgovanovic |
| 2017/0092272 | A1 | 3/2017 | Bargetzi et al. |
| 2017/0092278 | A1 | 3/2017 | Evermann et al. |
| 2017/0110130 | A1 | 4/2017 | Sharifi et al. |
| 2017/0110144 | A1 | 4/2017 | Sharifi et al. |
| 2017/0125035 | A1 | 5/2017 | Gao et al. |
| 2017/0132019 | A1 | 5/2017 | Karashchuk et al. |
| 2017/0206057 | A1 | 7/2017 | Lee et al. |
| 2017/0230448 | A1 | 8/2017 | Liu et al. |
| 2017/0358301 | A1 | 12/2017 | Raitio et al. |
| 2018/0233137 | A1* | 8/2018 | Torok ................. G06F 3/167 |
| 2018/0285064 | A1 | 10/2018 | Zhang et al. |
| 2018/0285065 | A1 | 10/2018 | Jeong |
| 2018/0286394 | A1 | 10/2018 | Li et al. |
| 2019/0082044 | A1 | 3/2019 | Melendez et al. |
| 2019/0139541 | A1 | 5/2019 | Andersen et al. |
| 2019/0155566 | A1 | 5/2019 | Dory et al. |

FOREIGN PATENT DOCUMENTS

| | | |
|---|---|---|
| CN | 107404381 | 11/2017 |
| JP | H09135432 | 5/1997 |
| JP | 2013/257418 | 12/2013 |

OTHER PUBLICATIONS

"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
"'Dolphin' attacks fool Amazon, Google voice assistants", BBC News, Sep. 7, 2017 (8 pages).
"Google Assistant SDK", Google Developers, Google, retrieved Aug. 22, 2017 from URL: https://developers.google.com/assistant/sdk/ (4 pages).
"Products Feed Specification", Google Merchant Center Help, Google, Inc., retrieved Mar. 18, 2013 from URL: http://www.support.google.com/merchants/bin/answer.py?hl=en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
Abrams, Brad, "Help users find, interact & re-engage with your app on the Google Assistant", Google Developers Blog, Nov. 15, 2017 (16 pages).
Albrecht, Chris, "Alexa, How Can You Be Used in Restaurants?", The Spoon, Dec. 10, 2017 (6 pages).
Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC5oazbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).
Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Crist, Ry, "Logitech Harmony's Alexa skill just got a whole lot better", CNET, Jul. 13, 2017 (2 pages).
Estes, Adam Clark, "Amazon's Newest Gadget Is a Tablet That's Also an Echo", Gizmodo, Sep. 19, 2017 (3 pages).
Examination Report for IN Appln. Ser. No. 201847003644 dated Oct. 29, 2020 (9 pages).
Final Office Action for U.S. Appl. No. 15/764,907 dated Dec. 14, 2020 (16 pages).
Final Office Action for U.S. Appl. No. 15/943,506 dated Mar. 16, 2020 (33 pages).
Forrest, Conner, "Essential Home wants to be bridge between Amazon's Alexa, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).
Gebhart, Andrew, "Google Home to the Amazon Echo: 'Anything you can do . . . '", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
International Preliminary Report on Patentability, Ch. II, for PCT Appln. Ser. No. PCT/US2017/065462 dated Mar. 23, 2020 (21 pages).
International Search Report and Written Opinion for PCT Appln. Ser. No. PCT/US2017/065462 dated Aug. 1, 2018 (16 pages).
Johnston, Lisa, "Amazon Whirlwind: New Echo, Plus, Spot, Connect, Fire TV Take the Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017 (2 pages).
Krishna, Swapna, "Jim Beam's smart decanter will pour you a shot when you ask", engadget, Nov. 29, 2017 (3 pages).

(56) References Cited

OTHER PUBLICATIONS

Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", BBC News, May 18, 2017 (9 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 15/764,907 dated Aug. 5, 2020 (13 pages).
Non-Final Office Action for U.S. Appl. No. 15/943,506 dated Oct. 6, 2020 (34 pages).
Non-Final Office Action for U.S. Appl. No. 15/943,506 dated Sep. 17, 2019 (32 pages).
Notice of Allowance for U.S. Appl. No. 15/764,907 dated Feb. 8, 2021 (7 pages).
Notice of Allowance for U.S. Appl. No. 15/943,506 dated Jan. 21, 2021 (8 pages).
Novet, et al., "Amazon is getting ready to bring Alexa to work", CNBC, Nov. 29, 2017 (4 pages).
Palladino, Valentina, "Garmin teamed up with Amazon to make a tiny Echo Dot for your car", ars Technica, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges at 'Silicon Beach'", Law360, Los Angeles, California, Feb. 2, 2017 (4 pages).
Willens, Max, "For publishers, Amazon Alexa holds promise but not much money (yet)", Digiday, Jul. 6, 2017 (6 pages).
Written Opinion of the International Preliminary Examining Authority for PCT Appln. Ser. No. PCT/US2017/065462 dated Nov. 15, 2019 (7 pages).
Machine Translated Chinese Search Report Corresponding to Application No. 201780098121.6 dated Mar. 1, 2023.

* cited by examiner

SIGNAL PROCESSING COORDINATION AMONG DIGITAL VOICE ASSISTANT COMPUTING DEVICES

CROSS-REFERENCES TO RELATED APPLICATIONS

This application claims the benefit of priority under 35 U.S.C. § 120 as a continuation of U.S. patent application Ser. No. 15/764,907, filed Mar. 30, 2018, which claims the benefit of priority as a U.S. National Stage under 35 U.S.C. § 371 of International Patent Application No. PCT/US2017/065462, filed Dec. 8, 2017 and designating the United States, each of which are hereby incorporated by reference herein in its entirety.

BACKGROUND

A computing device can be wirelessly discoverable by another computing device within range. However, as a greater number of computing devices are within discoverable range, the computing devices may each connect with one another, thereby introducing a risk of undesirable interference between computing devices, and increasing unnecessary network bandwidth usage and processor utilization.

SUMMARY

At least one aspect is directed to a system to coordinate signal processing among computing devices in a voice-driven computing environment. The system can include a plurality of digital assistant computing devices comprising a first digital assistant computing device, and a second digital assistant computing device. The plurality of digital assistant computing devices can be operational to control a plurality of network connected devices. The system can include a data processing system comprising one or more processors and memory to execute an orchestrator component and a direct action application programming interface ("API"). The data processing system can set the first digital assistant computing device as a primary signal processor, and set the second digital assistant computing device as a secondary signal processor. The system can include a sensor of the first digital assistant computing device to detect an input audio signal. The system can include a signal quality checker executed by the first digital assistant computing device to determine that the input audio signal detected by the sensor of the first digital assistant computing device satisfies a threshold for signal processing. The signal quality checker can transmit, to the data processing system, an indication that the first digital assistant computing device is operational to process the input audio signal. The system can include a sensor of the second digital computing device to detect the input audio signal. The system can include a signal quality checker executed by the second digital assistant computing device to determine that the input audio signal detected by the sensor of the second digital assistant computing device satisfies the threshold for signal processing. The second digital assistant computing device can transmit, to the data processing system, an indication that the second digital assistant computing device is operational to process the input audio signal. The orchestrator component of the data processing system can receive the indication from the first digital assistant computing device and the indication from the second digital assistant computing device. The orchestrator component of the data processing system can select, based on the first digital assistant computing device set as the primary signal processor and the indication that the first digital assistant computing device is operational to process the input audio signal, the first digital assistant to process the input audio signal. The orchestrator component of the data processing system can instruct the first digital assistant computing device to process the input audio signal. The orchestrator component of the data processing system can instruct the second digital assistant computing device to enter a standby mode to prevent the second digital assistant computing device from processing the input audio signal. The direct action API can receive data packets comprising a command from the first digital assistant computing device. The command can be generated by the first digital assistant based on the input audio signal. The direct action API can generate, for a network connected device selected from the plurality of network connected devices, an action data structure based on the command. The direct action API can transmit the action data structure to the network connected device to control the network connected device.

At least one aspect is directed to a method of coordinating signal processing among computing devices in a voice-driven computing environment. The method can include a sensor of a first digital assistant computing device detecting an input audio signal. The method can include a signal quality checker executed by the first digital assistant computing device determining that the input audio signal detected by the sensor of the first digital assistant computing device satisfies a threshold for signal processing. The method can include the first digital assistant computing device transmitting, to a data processing system comprising one or more processors and memory, an indication that the first digital assistant computing device is operational to process the input audio signal. The method can include detecting, by a sensor of a second digital computing device, the input audio signal. The method can include determining, by a signal quality checker executed by the second digital assistant computing device, that the input audio signal detected by the sensor of the second digital assistant computing device satisfies the threshold for signal processing. The method can include transmitting, to the data processing system, an indication that the second digital assistant computing device is operational to process the input audio signal. The method can include receiving, by the data processing system, the indication from the first digital assistant computing device and the indication from the second digital assistant computing device. The method can include selecting, by the data processing system, based on the first digital assistant computing device set as the primary signal processor and the indication that the first digital assistant computing device is operational to process the input audio signal. The first digital assistant processes the input audio signal. The method can include the data processing system instructing the first digital assistant computing device to process the input audio signal. The method can include the data processing system instructing the second digital assistant computing device to enter a standby mode to prevent the second digital assistant computing device from processing the input audio signal. The method can include the data processing system receiving data packets comprising a command from the first digital assistant computing device. The command can be generated by the first digital assistant based on the input audio signal. The method can include the data processing system generating, for a network connected device selected from a plurality of network connected devices, an action data structure based on the command. The method can include the data processing system transmitting the action data structure to the network connected device to control the network connected device.

At least one aspect is directed to a digital assistant computing device. The digital assistant computing device can include a sensor to detect an input audio signal. The digital assistant computing device can include an audio driver and a signal quality checker executed by a pre-processor component. The pre-processor component can be coupled to the sensor and the audio driver. The pre-processor component can determine that the input audio signal detected by the sensor of the digital assistant computing device satisfies a threshold for signal processing. The pre-processor component can transmit, to a data processing system via a network, an indication that the digital assistant computing device is operational to process the input audio signal to cause the data processing system to receive the indication from the digital assistant computing device. The data processing system can determine that the digital computing device is set as a primary signal processor and a second digital computing device that detects the input audio signal is set as a secondary signal processor. The second digital computing device can be operational to process the input audio signal. The data processing system can select, based on the digital assistant computing device set as the primary signal processor and the indication that the digital assistant computing device is operational to process the input audio signal, the digital assistant to process the input audio signal. The data processing system can transmit, to the digital assistant computing device, instructions to process the input audio signal. The data processing system can transmit, to the second digital assistant computing device, instructions to enter a standby mode to prevent the second digital assistant computing device from processing the input audio signal. The pre-processor component of the digital assistant computing device can receive the instructions to process the input audio signal. The pre-processor component of the digital assistant computing device can generate data packets comprising a command based on the input audio signal. The pre-processor component of the digital assistant computing device can transmit the data packets to the data processing system to cause the data processing system to generate, for a network connected device selected from a plurality of network connected devices, an action data structure based on the command received from the digital computing device. The data processing system can transmit the action data structure to a network connected device to control the network connected device.

The data processing system may determine that audio input signal includes an instruction to use the second digital assistant computing device and selecting the first digital assistant to process the input audio signal may comprise overriding the instruction to use the second digital assistant computing device.

The plurality of digital assistant computing devices may be heterogeneous devices. For example, the first digital assistant computing device may comprise a first type of device, and the second digital assistant computing device comprising a second type of device.

Each of the first digital assistant computing device, the second digital assistant computing device, and the network connected device may be configured with an assistant software development kit. The first type of device may comprise at least one of a speaker device, a television device, a mobile device, and a wearable device. The second type of device may comprise at least one of the speaker device, the television device, the mobile device, and the wearable device. The network connected device may comprise at least one of the speaker device, the television device, the mobile device, the wearable device, a digital lamp, a digital thermostat, a digital appliance, and a digital automobile.

The method may further comprise, at the data processing system polling the first digital assistant computing device to obtain one or more characteristics of the first digital assistant computing device, polling the second digital assistant component to obtain the one or more characteristics of the second digital assistant computing device, determining, based on a comparison of the one or more characteristics of the first digital assistant computing device and the one or more characteristics of the second digital assistant computing device, to set the first digital assistant computing device as a primary signal processor, and the second digital assistant computing device as a secondary signal processor, and setting the first digital assistant computing device as the primary signal processor, and setting the second digital assistant computing device as the secondary signal processor.

The method may further comprise, by the data processing system, storing, in a centralized account in the memory, a first link between the first digital assistant computing device and the network connected device, and a second link between the second digital assistant computing device and the network connected device. The data processing system may access, responsive to selection of the first digital assistant computing device and based on the first link, the centralized account responsive to retrieve information for generation of the action data structure.

The centralized account may store information associated with a plurality of heterogeneous network connected devices with links to at least one of the first digital assistant and the second digital assistant.

The data processing system may determine, based on a machine learning model, to set the first digital assistant computing device as the primary signal processor.

The data processing system may detect a change in a condition of the first digital assistant computing device and switch, based on the change in the condition of the first digital assistant computing device, the second digital assistant computing device to the primary signal processor, and switch the first digital assistant computing device to the secondary signal processor.

The data processing system may determine, based on a machine learning model, the threshold for signal processing, and store the threshold in a centralized account in the memory.

The sensor of the first digital assistant computing device may receive a second input audio signal. The signal quality checker executed by the first digital assistant computing device may determine that the second input audio signal detected by the sensor of the first digital assistant computing device fails to satisfy the threshold for signal processing, and may transmit, to the data processing system, an indication that the first digital assistant computing device is non-operational to process the second input audio signal. The sensor of the second digital assistant computing device may receive the second input audio signal. The signal quality checker executed by the second digital assistant computing device may determine that the second input audio signal detected by the sensor of the second digital assistant computing device satisfies the threshold for signal processing, and may transmit, to the data processing system, an indication that the second digital assistant computing device is operational to process the second input audio signal. The data processing system may receive, from the first digital assistant computing device, the indication that the first digital assistant computing device is non-operational to process the second input audio signal, receive, from the second digital assistant computing device, the indication that the second digital assistant computing device is operational to process the second input audio signal, and select, based on the first digital assistant computing device being non-operational to process the second input audio signal and the second digital assistant computing device being operational to process the second input audio signal, the second digital assistant computing process the second input audio signal. The direct action API may receive data packets comprising a second command from the second digital assistant computing device.

At least one aspect is directed to a system that is configured to perform the method of coordinating signal processing among computing devices in a voice-driven computing environment. For example, the system can include a plurality of digital assistant computing devices comprising a first digital assistant computing device, and a second digital assistant computing device. The system can include a network connected device executing an interface controllable by both of the first digital assistant computing device and the second digital assistant computing device. The system can include a data processing system comprising one or more processors and memory to execute an orchestrator component and a direct action application programming interface ("API"). The data processing system can set the first digital assistant computing device as a primary signal processor, and set the second digital assistant computing device as a secondary signal processor. The system can include a sensor of the first digital assistant computing device to detect an input audio signal. The system can include a signal quality checker executed by the first digital assistant computing device to determine that the input audio signal detected by the sensor of the first digital assistant computing device satisfies a threshold for signal processing. The signal quality checker can transmit, to the data processing system, an indication that the first digital assistant computing device is operational to process the input audio signal. The system can include the sensor of the second digital computing device to detect the input audio signal. The system can include the signal quality checker executed by the second digital assistant computing device to determine that the input audio signal detected by the sensor of the second digital assistant computing device satisfies the threshold for signal processing. The second digital assistant computing device can transmit, to the data processing system, an indication that the second digital assistant computing device is operational to process the input audio signal. The orchestrator component of the data processing system can receive the indication from the first digital assistant computing device and the indication from the second digital assistant computing device. The orchestrator component of the data processing system can select, based on the first digital assistant computing device set as the primary signal processor and the indication that the first digital assistant computing device is operational to process the input audio signal, the first digital assistant to process the input audio signal. The orchestrator component of the data processing system can instruct the first digital assistant computing device to process the input audio signal. The orchestrator component of the data processing system can instruct the second digital assistant computing device to enter a standby mode to prevent the second digital assistant computing device from processing the input audio signal. The direct action API can receive data packets comprising a command from the first digital assistant computing device. The command can be generated by the first digital assistant based on the input audio signal. The direct action API can generate an action data structure based on the command. The direct action API can transmit the action data structure to the network connected device to control the network connected device.

At least one aspect is directed to a digital assistant device configured to perform the method of coordinating signal processing among computing devices in a voice-driven computing environment. For example, the digital assistant device can include a sensor to detect an input audio signal. The digital assistant device can include an audio driver and a signal quality checker executed by a pre-processor component. The pre-processor component can be coupled to the sensor and the audio driver. The pre-processor component can determine that the input audio signal detected by the sensor of the digital assistant computing device satisfies a threshold for signal processing. The pre-processor component can transmit, to a data processing system via a network, an indication that the digital assistant computing device is operational to process the input audio signal to cause the data processing system to receive the indication from the digital assistant computing device. The data processing system can determine that the digital computing device is set as a primary signal processor and a second digital computing device that detects the input audio signal is set as a secondary signal processor. The second digital computing device can be operational to process the input audio signal. The data processing system can select, based on the digital assistant computing device set as the primary signal processor and the indication that the digital assistant computing device is operational to process the input audio signal, the digital assistant to process the input audio signal. The data processing system can transmit, to the digital assistant computing device, instructions to process the input audio signal. The data processing system can transmit, to the second digital assistant computing device, instructions to enter a standby mode to prevent the second digital assistant computing device from processing the input audio signal. The pre-processor component of the digital assistant computing device can receive the instructions to process the input audio signal. The pre-processor component of the digital assistant computing device can generate data packets comprising a command based on the input audio signal. The pre-processor component of the digital assistant computing device can transmit the data packets to the data processing system to cause the data processing system to generate an action data structure based on the command received from the digital computing device. The data processing system can transmit the action data structure to a network connected device to control the network connected device.

The digital assistant device may comprise an audio driver and a speaker component. The pre-processor component may receive an indication of a status of the action data structure transmitted to the network connected device, and instruct the audio driver to generate an output audio signal to cause the speaker component to transmit an audio output corresponding to the indication of the status.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
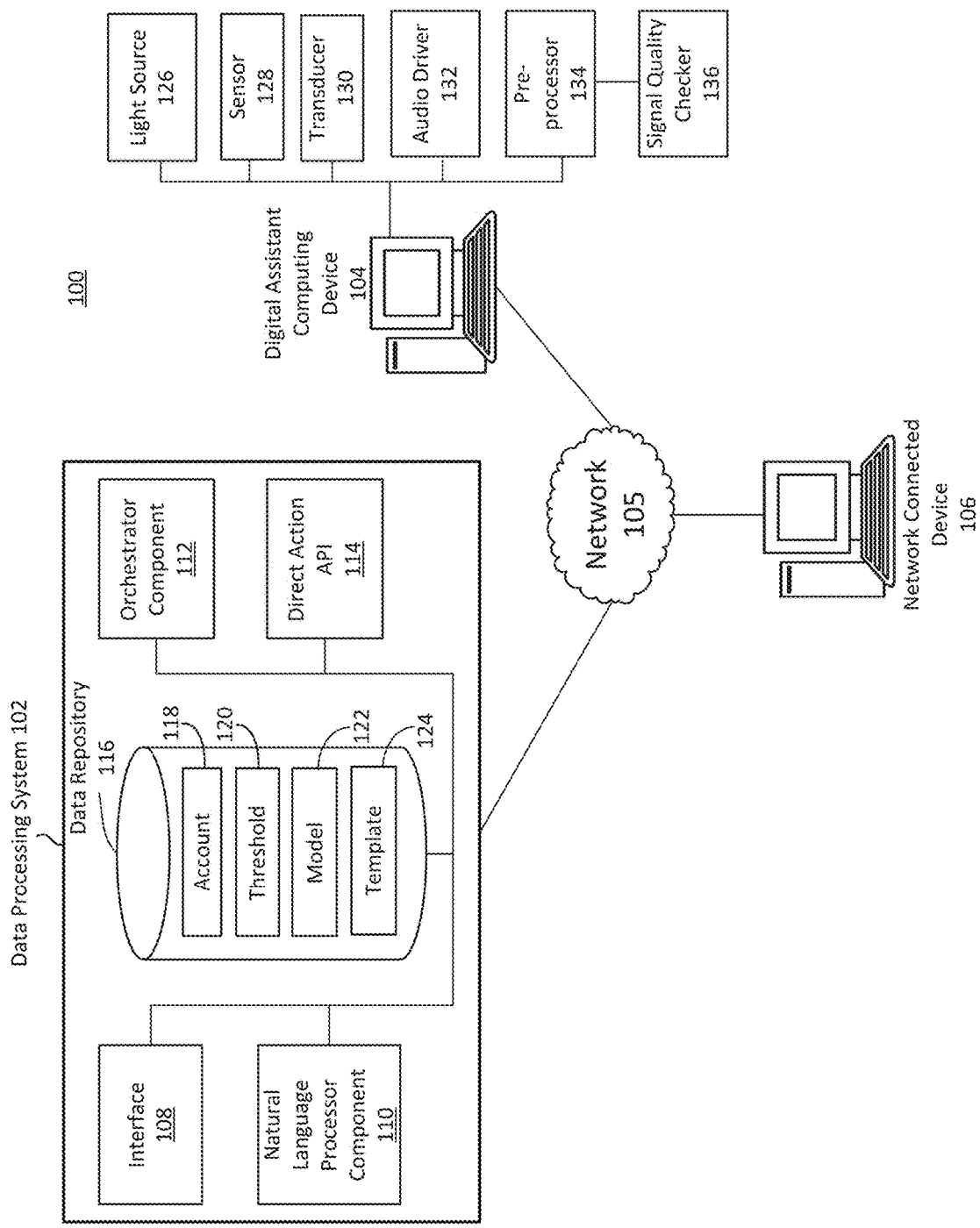
FIG. 1 is an illustration of a system to coordinate signal processing among computing devices in a voice-driven computing environment.

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to coordinating signal processing among digital voice assistant computing devices. For example, multiple network connected devices can be located in a room and be in an on, always-on, discoverable, or always discoverable mode. When network connected devices are discoverable, digital assistant computing devices can attempt to control the network connected devices responsive to an instruction or command. If multiple digital assistant computing devices are located in the room, then each digital assistant computing device may attempt to interact with or control the same network connected device responsive to a voice query. Further, if there are multiple network connected devices that are capable of being controlled by one or more of the digital assistant computing devices, then the system may erroneously control the wrong network connected device. Thus, in a voice-based computing environment in which multiple digital assistant computing devices can both receive the voice command and control multiple network connected devices, computing resources may be wasted due to redundant processing, or errors may arise due to redundant commands transmitted to incorrect network controlled devices. For example, if the voice command was to increase the temperature in the living room, and two digital assistant computing devices detected the voice command, then they may both inadvertently send instructions to multiple thermostats in the house (e.g., living room thermostat and bedroom thermostat) to increase the temperature, thereby causing the thermostat to in increase the temperature twice, causing multiple thermostats to increase the temperature, or causing the wrong thermostat to ignore the instructions, thereby resulting in wasted computing resources.

Systems and methods of the present solution coordinate signal processing among digital voice assistant computing devices or network connected devices. The digital voice assistant computing devices can each detect the same input audio signal, and then transmit an indication to a centralized data processing system. The data processing system can parse the input audio signals, or data packets carrying the input audio signal, select a network connected device from a plurality of network connected devices, and generate an action data structure for the selected network connected device. The data processing system can transmit the action data structure to the corresponding network connected device to perform the desired action.

The data processing system can use machine learning to select one of the digital assistant computing devices or network connected devices to perform an action. For example, there may be multiple network connected devices that can perform the desired action. The data processing system can utilize machine learning to select the network connected device to perform the desired action. In some cases, the data processing system can utilize tie-breaking logic to select one of the networked computing devices to perform the action.

FIG. 1 illustrates an example system 100 to orchestrate signal processing among computing devices in a voice-driven computing environment. The system 100 can include content selection infrastructure. The system 100 can include a data processing system 102. The data processing system 102 can communicate with one or more of a digital assistant computing device 104 or a network connected device 106 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one digital assistant computing device 104. For example, via the network 105 a user of the digital assistant computing device 104 can access information or data provided by a data processing system 102, or interact with a network connected device 106.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include one or more digital assistant computing devices 104. The digital assistant computing device 104 can include or refer to a laptop, desktop, tablet, computing device, local computing device, smart phone, portable computer, or speaker that is configured with a digital assistant software development kit or functionality to provide voice-based interactions. The digital assistant computing device 104 may or may not include a display; for example, the computing device may include limited types of user interfaces, such as a microphone and speaker. In some cases, the primary user interface of the digital assistant computing device 104 may be a microphone and speaker, or voice interface.

While the digital assistant computing device 104 can refer to a hardware device, in some cases, the digital assistant computing device 104 can refer to a combination of hardware and software components. In some cases, the digital assistant computing device 104 can refer to software components or modules, such as an application executing on a computing device 104 that is configured to perform one or more functionality associated with the systems and methods of the present disclosure.

The digital assistant computing device 104 can include, interface, or otherwise communicate with at least one light source 126, sensor 128, transducer 130, audio driver 132, or pre-processor 134. The light source 126 can include a light indicator, light emitting diode ("LED"), organic light emitting diode ("OLED"), or other visual indicator configured to provide a visual or optic output. The sensor 128 can include, for example, an ambient light sensor, proximity sensor, temperature sensor, accelerometer, gyroscope, motion detector, GPS sensor, location sensor, microphone, or touch sensor. The transducer 130 can include a speaker or a microphone. The audio driver 132 can provide a software interface to the hardware transducer 130. The audio driver can execute the audio file or other instructions provided by the data processing system 102 to control the transducer 130 to generate a corresponding acoustic wave or sound wave. The pre-processor 134 can include a processing unit having hardware configured to detect a keyword and perform an action based on the keyword. The pre-processor 134 can filter out one or more terms or modify the terms prior to transmitting the terms to the data processing system 102 for further processing. The pre-processor 134 can convert the analog audio signals detected by the microphone into a digital audio signal, and transmit one or more data packets carrying the digital audio signal to the data processing system 102 via the network 105. In some cases, the pre-processor 134 can transmit data packets carrying some or all of the input audio signal responsive to detecting an instruction to perform such transmission. The instruction can include, for example, a trigger keyword or other keyword or approval to transmit data packets comprising the input audio signal to the data processing system 102. The pre-processor 134 can include or execute a signal quality checker 136 that detects an input signal and determine whether the input signal satisfies a threshold for signal processing.

The digital assistant computing device 104 can be associated with an end user that enters voice queries as audio input into the digital assistant computing device 104 (via the sensor 128) and receives audio output in the form of a computer generated voice that can be provided from the data processing system 102 to the local client digital assistant computing device 104, output from the transducer 130 (e.g., a speaker). The computer generated voice can include recordings from a real person or computer generated language.

The digital assistant computing device 104 can be positioned in a location to allow a user to interact with the digital assistant computing device 104 using voice input or other input. The digital assistant computing device 104 can be located remote from a remote server, such as a data processing system 102. The digital assistant computing device 104 can be positioned in a house, condo, apartment, office, hotel room, mall, cubicle, or other building or abode at which a user can interact with the digital assistant computing device 104 using voice input, whereas the data processing system 102 can be located remotely in a data center, for example.

The system 100 can include multiple digital assistant computing devices 104 that are operational to receive input audio signals from a user. For example, a first digital assistant computing device 104 and a second digital assistant computing device 104 can be placed, positioned, or otherwise located within an area, region or room such that both the first digital assistant computing device 104 and the second digital assistant computing device 104 can detect an input audio signal. The input audio signal can include voice or acoustic waves provided or spoken by an end user. The input audio signal can be detected by both the first digital assistant computing device 104 and the second digital assistant computing device 104. The input audio signal may not include identifying information specifying that one of the first digital assistant computing device 104 or the second digital assistant computing device 104 is to process the input audio signal.

In some cases, the input audio signal can include identifying information specifying which of the first digital assistant computing device 104 or the second digital assistant computing device 104 is to process the input audio signal. Identifying information can include a label or other identifier assigned to the first or second digital assistant computing device 104, such as "first", "home", "living room", or "kitchen". Identifying information can include alphanumeric values. In some cases, if the input audio signal includes identifying information that can be used to select one of the first or second digital computing device 104 to use for further processing, the data processing system 102 can instruct the corresponding digital assistant computing device to perform the further signal processing. In some cases, the data processing system 102 can determine to override the identifying information and select the digital assistant computing device 104 that may not be identified in the input audio signal. The data processing system 102 can determine, based on a policy, that a digital assistant computing device not identified in the input audio signal may be better suited to process the input audio signal relative to the digital assistant computing device that was identified in the input audio signal. The digital assistant computing device not identified in the input audio signal may be better suited to process the input audio signal because it may have detected a higher quality version of the input audio signal (e.g., source of input audio signal may be located closer, or the microphone may be higher quality), have a faster processor, have more memory available, have a faster network connection, have greater battery power remaining or connected to a power outlet, or have more or higher quality input/output interfaces (e.g., multiple microphones, a speaker, display, touch interface, gesture interface, sensors, keyboard, or mouse). In this way, the system 100 can facilitate more accurate processing of the input audio signal.

The digital assistant computing device 104 can include, access, or otherwise interact with a signal quality checker 136. The signal quality checker 136 can refer to a hardware or software component or module. The signal quality checker 136 can include one or more processors, circuits, logic arrays, applications, programs, application programming interfaces or other components or modules. The signal quality checker 136 can include at least one processing unit or other logic device such as programmable logic array engine, or module configured to communicate with the pre-processor 134, sensor 128, transducer 130, or audio driver 132. The signal quality checker 136 and pre-processor 134 can be a single component, or part of the digital assistant computing device 104. The digital assistant computing device 104 can include hardware elements, such as one or more processors, logic devices, or circuits.

The signal quality checker 136 can receive a detected input audio signal and analyze the input audio signal to determine a quality parameter of the input audio signal. The signal quality checker 136 can determine whether the quality parameter of the input audio signal satisfies a threshold. The signal quality checker 136 can determine whether the detected input audio signal is of sufficient quality for further signal processing.

To process the input audio signal, the digital assistant computing device 104 can detect the input audio signal at a certain quality level. For example, if the input audio signal detected by the digital assistant computing device 104 has low or poor quality, then downstream processing by digital assistant computing device 104 on the input audio signal may be erroneous, unreliable, fail, or require excessive processor or memory utilization. In some cases, the downstream processing may generate additional prompts, such as audio prompts, requiring the end user to repeat certain terms. In some cases, the erroneous downstream processing may result in action data structures with incorrect instructions or command being transmitted to the incorrect network connected device 106. Thus, since the system 100 may include multiple digital assistant computing devices 104, checking the quality of the input audio signals received by the multiple digital assistant computing devices 104, and selecting one of the digital assistant computing devices 104 for further signal processing may reduce errors, reduce processor utilization, reduce memory consumption, all while increasing the signal processing accuracy and generating action data structures with correct instructions and commands.

The quality parameter can include, for example, a signal-to-noise ratio (e.g., the signal strength as a ratio to a noise floor measured in decibels), sample rate, spurious-free dynamic range (e.g., the strength ratio of the fundamental signal to the strongest spurious signal; can be defined as the ratio of the root-mean-square ("RMS") value of the carrier wave or maximum signal component) at the input of the analog-to-digital converter to the RMS value of the next largest noise or harmonic distortion component); total harmonic distortion ratio (e.g., measurement of the harmonic distortion present in the input audio signal and can be defined as the ratio of the sum of the powers of harmonic components to the power of the fundamental frequency); frequency range; or dynamic range. Additional quality parameters can be based on speech recognition quality metrics, such as word error rate (e.g., computed by comparing a reference transcription with the transcription output by the speech recognizer), word accuracy, or confidence level associated with word accuracy (e.g., a likelihood assigned by the pre-processor 134 that the pre-processor 134 accurately recognized the words in the input signal.

For example, the signal quality checker 136 can apply a policy to the input audio signal to determine whether the input audio signal satisfies a threshold. The signal quality checker 136 can obtain the policy from the data processing system 102. The signal quality checker 136 can receive the policy from the account data structure 118 or the threshold data structure 120, which can store one or more policies and associated thresholds to use to apply the policy. For example, the policy can be to compare the signal-to-noise ratio with a threshold signal to noise ratio. The threshold SNR can be dynamic. The threshold SNR can be set based on historic machine learning model. The threshold SNR can be customized for a type of digital assistant computing device 104. The threshold SNR can be customized based on characteristics of the digital assistant computing device (e.g., a number of microphones or other characteristics of the microphone). The threshold SNR can be applied to an aggregate input audio signal determined by combining or summing multiple input audio signals detected from multiple microphones of the same digital assistant computing device 104. The threshold SNR can be, for example, −18 dB, −15 db, −12 dB, −9 dB, −6 dB, −3 dB, 0 dB, 3 dB, 6 dB or some other value.

If the signal-to-noise ratio of the input signal is greater than or equal to the threshold, then the signal quality checker 136 determines that the input signal detected by the first digital assistant computing device 104 satisfies the threshold. If the signal quality checker 136 determines the quality parameter of the input audio signal satisfies the threshold, then the signal quality checker 136 can determine that the first digital assistant computing device 104 is operational to process the input audio signal because the input audio signal is detected with sufficient quality to reliably and accurately process the input audio signal without excessive errors.

In some cases, the signal quality checker 136 can analyze a portion of the input audio signal to determine the quality of the detected input audio signal. The signal quality checker 136 can analyze the full detected input audio signal. The signal quality checker 136 can analyze a predetermined portion of the input audio signal (e.g., the first 1 second, first 2 seconds, 3 seconds, 4 seconds, 5 seconds, 10 seconds). In some cases, the signal quality checker 136 can perform speech-to-text recognition on a portion of the detected input audio signal to determine whether the quality of the detected input audio signal is satisfactory.

In some cases, the digital assistant computing device 104 can transmit the input audio signal to the data processing system 102, and the data processing system 102 can perform the signal quality check. For example, the signal quality checker 136 can execute on the data processing system 102. The digital assistant computing device 104 can transmit a predetermined portion of the input audio signal (e.g., first 1 second, 2 seconds, 3 seconds, or 5 seconds) to the data processing system 102, and the data processing system 102 can perform signal quality check on the signal. The data processing system 102, upon performing the signal quality check, can instruct one of the digital assistant computing devices 104 to perform further processing on the input audio signal.

The signal quality checker 136 can transmit an indication to the data processing system 102. The signal quality checker 136 can transmit an indication that the digital assistant computing device 104 is operational to process the input audio signal. If the signal quality checker 136 determines that the input audio signal was detected with sufficient quality to reliably and accurately perform downstream processing, then the signal quality checker 136 can transmit, responsive to the determination, that the digital assistant computing device 104 is operational to process the input audio signal.

The signal quality checker 136 can transmit an indication that the digital assistant computing device 104 is not operational to process the input audio signal. If the signal quality checker 136 determines that the detected input audio signal is not of sufficient quality (e.g., SNR is below the threshold), then the signal quality checker 136 can transmit, responsive to the determination, an indication that the digital assistant computing device is not operational to process the detected input audio signal.

The system 100 can include, access, or otherwise interact with at least one network connected device 106. The network connected device 106 can refer to a third-party device. The network connected device 106 can include at least one logic device such as a computing device having a processor or circuit to communicate via the network 105, for example, with the digital assistant computing device 104 or the data processing system 102. The network connected device 106 can include at least one computation resource, server, processor or memory. For example, network connected device 106 can include a plurality of computation resources or servers located in at least one data center. The network connected device 106 can include or refer to an internet-of-things device. The network connected device 106 can include, for example, at least one of a speaker device, a television device, a mobile device, a wearable device, a digital lamp, a digital thermostat, a digital appliance, or a digital automobile. For example, the digital assistant computing device 104 can control an output light intensity level of a network connected device 106 including a digital lamp. The digital assistant computing device 104 can detect an input audio signal from an end user with a command to adjust the light intensity (e.g., decrease the intensity, increase the intensity, turn off the light source, or turn on the light source), and then provide the command to the network connected device 106 (e.g., via the data processing system 102).

The system 100 can include at least one data processing system 102. The data processing system 102 can include at least one logic device such as a computing device having a processor to communicate via the network 105, for example with the digital assistant computing device 104 or the network connected device 106. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The data processing system 102 can include, interface, or otherwise communicate with at least one interface 108. The data processing system 102 can include, interface, or otherwise communicate with at least one natural language processor component 110. The data processing system 102 can include, interface, or otherwise communicate with at least one orchestrator component 112. The orchestrator component 112 can coordinate signal processing among digital assistant computing devices. The data processing system 102 can include, interface, or otherwise communicate with at least one direct action application programming interface ("direct action API") 114. The data processing system 102 can include, interface, or otherwise communicate with at least one data repository 116.

The data repository 116 can include one or more local or distributed databases, and can include a database management system. The data repository 116 can include computer data storage or memory and can store one or more accounts 118, one or more thresholds 120, one or more models 122, or one or more templates 124. The account data structure 118 can refer to a central account or centralized account that can include information associated with digital assistant computing devices 104 or network connected devices 106. The information can include status information, mode information, links, or profile information. The threshold data structure 120 can include values for a threshold that can be used by the signal quality checker 136 to determine whether the quality of the detected audio signal is sufficient for signal processing. The threshold can include a numeric value, or alphanumeric value. The template 124 can include fields and values used by the direct action API 114 to generate an action data structure. The model 122 can refer to a machine learning model. For example, the machine learning model 122 can be generated based on historical indications associated with the digital assistant computing devices 104. The machine learning model can be generated based on historical quality parameter values for input audio signal detected by digital assistant computing devices 104. The machine learning model can be generated based on characteristics or configuration associated with the digital assistant computing devices 104.

The interface 108, NLP component 110, orchestrator component 112, or direct action API 114 can each include at least one processing unit or other logic device such as programmable logic array engine, or module configured to communicate with the database repository or data repository 116. The interface 108, natural language processor component 110, orchestrator component 112, direct action API 114, or data repository 116 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a digital assistant computing device 104 can affirmatively authorize the data processing system 102 to obtain network activity information corresponding to the digital assistant computing device 104. For example, the data processing system 102 can prompt the user of the digital assistant computing device 104 for consent to obtain one or more types of network activity information. The identity of the user of the digital assistant computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

The data processing system 102 can include an interface 108 designed, configured, constructed, or operational to receive and transmit information using, for example, data packets. The interface 108 can receive and transmit information using one or more protocols, such as a network protocol. The interface 108 can include a hardware interface, software interface, wired interface, or wireless interface. The interface 108 can facilitate translating or formatting data from one format to another format. For example, the interface 108 can include an application programming interface that includes definitions for communicating between various components, such as software components. The interface 108 can communicate with one or more of the digital assistant computing device 104 or network connected device 106 via network 105.

The data processing system 102 can interface with an application, script or program installed at the digital assistant computing device 104, such as an app to communicate input audio signals to the interface 108 of the data processing system 102 and to drive components of the digital assistant computing device to render output audio signals. The data processing system 102 can receive data packets or other signal that includes or identifies an audio input signal.

The data processing system 102 can include, interface with or otherwise access an orchestrator component 112 designed, constructed and operational to receive indications from the digital assistant computing devices 104, select one of the digital assistant computing devices 104 to process the input audio signal, and instruct the selected digital assistant computing device 104 to process the detected input audio signal. The orchestrator component 112 can coordinate signal processing to reduce the overall processor, memory and bandwidth utilization of the system 100 that includes multiple digital assistant computing devices 104 that each detected the same input audio signal carrying a command to control the same network connected device 106. Rather than allow both digital assistant computing devices 104 to process the same detected input audio signal, the orchestrator component 112 can select one of the digital assistant computing devices 104 to perform the downstream processing to parse the input audio signal and generate data packets comprising a command, and transmit the data packets to the data processing system 102, which can apply further natural language processing to identify the command, generate an action data structure, and transmit the action data structure to the corresponding network connected device 106 to control the network connected device 106.

The orchestrator component 112 can receive indications from each digital assistant computing device 104 that detected an input audio signal. In some cases, the orchestrator component 112 can receive the indications before the digital assistant computing devices 104 perform further processing on the input audio signal. For example, the orchestrator component 112 can receive the indications before the digital assistant computing devices 104 parse the input audio signal to convert the input audio signal to data packets, perform natural language processing, filtering, or otherwise process the input audio signal. The digital assistant computing devices 104 can transmit the indication and wait for an instructions from the data processing system 102 prior to performing further processing on the input audio signal. The digital assistant computing devices 104 (e.g., via the signal quality checker 136) can block, pause, or put on hold further downstream processing until the data processing system 102 provides further instructions, thereby avoiding or reducing wasted computing resource utilization.

The indication the orchestrator component 112 receives can include a timestamp, account identifier, and location information. The orchestrator component 112 can use the timestamp, account identifier and location information to determine that the input signal detected by multiple digital assistant computing devices 104 is the same input audio signal, albeit of varying quality levels. The timestamp can indicate a time at which the input audio signal was detected by the digital assistant computing device 104. The orchestrator component 112 can compare the timestamps associated with multiple indications to determine that the digital assistant computing devices 104 detected the same input audio signal. The orchestrator component 112 can further compare the timestamps and the account identifiers to determine whether the indications correspond to the same input audio signal. The orchestrator component 112 can further compare the timestamps, account identifiers, and location information associated with each indication to determine whether the indications corresponds to the same input audio signal. For example, if the indications correspond to an input audio signal beginning at timestamp 3:34:10 PM, and having a location corresponding to a same internet protocol address associated with the same wireless gateway, the orchestrator component 112 can determine that the indications are associated with the same input audio signal. In another example, the timestamp can include a beginning timestamp for the input audio signal, and a duration of the input audio signal. The orchestrator component 112 can compare the beginning timestamp, the duration, and the account identifier to determine whether the multiple digital assistant computing devices detected a same input audio signal.

The account identifier can correspond to an account or profile used to configure or set up the digital assistant computing device 104. The account can be used to enable or log-in to the digital assistant computing device 104. The digital assistant computing device 104 can be linked to the account. The account information can be stored in account data structure 118 on data repository 116 in the data processing system 102. One or more digital assistant computing devices 104 can be linked to the same account stored in account data structure 118. One or more network connected devices 106 can be linked to the same account. The account can include an identifier, such as an alphanumeric value.

The orchestrator component 112 can receive, from a first digital assistant computing device 104, an indication that the first digital assistant computing device 104 is operational to process the input audio signal. The orchestrator component 112 can further receive, from a second digital assistant computing device 104, an indication that the second digital assistant computing 104 is operational to process the input audio signal. In some cases, the orchestrator component 112 can receive an indication from at least one of the first or second digital assistant computing devices 104 that at least one of the first or second digital assistant computing devices 104 is not operational to process the input audio signal.

If the orchestrator component 112 receives indications that both the first and second digital assistant computing devices 104 are operational to process the same input audio signal, then the orchestrator component 112 can select one of the first or second digital assistant computing device 104 to perform the further signal processing. For example, the orchestrator component 112 can assign or set one of the first digital assistant computing device 104 or the second digital assistant computing device 104 as the primary signal processor, and the other of the first or second digital assistant computing device 104 as the secondary signal processor.

The orchestrator component 112 can, by default, select the primary signal processor responsive to receiving the indication that the primary signal processor is operational to process the input audio signal.

The orchestrator component 112 can set one of the first or second digital assistant computing devices 104 as the primary signal processor, and the other of the first or second digital assistant computing devices 104 as the secondary signal processor. The orchestrator component 112 can poll one or more digital assistant computing devices 104 associated with an account identifier to obtain characteristics associated with the one or more digital assistant computing devices 104, and set one of the one or more digital assistant computing devices 104 as a primary signal processor based on an analysis of the characteristics. For example, the orchestrator component 112 can poll the first digital assistant computing device to obtain one or more characteristics of the first digital assistant computing device. The orchestrator component 112 can poll the second digital assistant computing device 104 to obtain the one or more characteristics of the second digital assistant computing device 104. The orchestrator component 112 can determine, based on a comparison of the one or more characteristics of the first digital assistant computing device 104 and the one or more characteristics of the second digital assistant computing device 104, to set the first digital assistant computing device 104 as a primary signal processor, and the second digital assistant computing device 104 as a secondary signal processor. The orchestrator component 112 can then set the first digital assistant computing device 104 as the primary signal processor, and set the second digital assistant 104 computing device as the secondary signal processor.

The characteristic can include or be based on the type of device or a configuration of the device. For example, the type of device can include a speaker device, a television device, a mobile device, and a wearable device. The orchestrator component 112 can prioritize certain types of devices over other types of devices. For example, the priority of types of devices can be as follows in Table 1.

TABLE 1

Illustration of priority ranking of types of digital assistant computing devices.

| Type of Device | Priority Rank (1 being the highest) |
| --- | --- |
| dedicated digital assistant computing device | 1 |
| speaker device | 2 |
| television device | 3 |
| mobile device | 4 |
| wearable device | 5 |

The types of devices may allow a fast determination to be made based on common characteristics of devices of that type, without requiring specific information about the particular devices. Additionally or alternatively, the data processing system 102 can rank devices bases on characteristics of the device or a current configuration of the device. Characteristics can refer to a processor speed, microphone quality, number of microphones, speaker quality, types of input/output interfaces, model year of the device, or network speed of the device. A current configuration can refer to whether the device is connected to a power outlet or running off of a battery, an operating system version, or application version.

The orchestrator component 112 can apply a policy to the characteristics or configuration of the digital assistant computing device 104 to determine to set the digital assistant computing device 104 as the primary signal processor or secondary signal processor. For example, if the digital assistant computing device 104 is connected to a power outlet and is a dedicated digital assistant computing device (e.g., a computing device whose primary purpose, by design, is to serve as a voice-based digital assistant), then the data processing system 102 can set the dedicated digital assistant computing device to be the primary signal processor. In another example, if the first digital assistant computing device 104 is connected to a power outlet, and the second digital assistant computing device 104 is a wearable device that is not connected to power outlet but is running off of battery power, then the data processing system 102 can set the first digital assistant computing device 104 as the primary signal processor, and the second digital assistant computing device 104 as the secondary signal processor. In another example, if both the first and second digital devices are connected to power outlets, but the first digital assistant computing device has a higher quality microphone and a faster hardware processor with more memory, then the orchestrator component 112 can set the first digital assistant computing device 104 as the primary signal processor.

The orchestrator component 112 can dynamically set digital assistant computing devices as the primary or secondary signal processor. The orchestrator component 112 can detect a change in a condition (e.g., a characteristics or configuration) of the first digital assistant computing device. The orchestrator component 112 can switch, based on the change in the condition of the first digital assistant computing device, the second digital assistant computing device to the primary signal processor, and switch the first digital assistant computing device to the secondary signal processor. Change in a condition can refer to a change in a characteristic or configuration. Change in a condition can include the software version becoming outdated, the device being unplugged from a power outlet, the battery power level becoming low (e.g., less than 20%), the battery level becoming higher than the primary signal processor's battery level, or the a component failing a diagnostic check (e.g., microphone is faulty or detects high noise level).

The orchestrator component 112 can use a machine learning algorithm, model or process to set one of the one or more digital assistant computing devices 104 as the primary digital assistant computing device. The orchestrator component 112 can determine, based on the machine learning model, to set the first digital assistant computing device as the primary signal processor. The machine learning model can be stored in model data structure 122 in the data repository 116. The machine learning model 122 can be generated based on historical indications associated with the digital assistant computing devices 104. The machine learning model can be generated based on historical quality parameter values for input audio signal detected by digital assistant computing devices 104. The machine learning model can be generated based on characteristics or configuration associated with the digital assistant computing devices 104.

For example, the machine learning algorithm or model can be generated based on a combination of two or more of historical indications as to whether the digital assistant computing device was operational to process input audio signals, device characteristics (e.g., microphone quality or number of microphones, processor speed, available memory), current configuration (e.g., software version, whether connected to power outlet or running on battery), and creating an action data structure that successfully controls the network connected device 106 in a manner desired by the end user that provided the input audio signal. The orchestrator component 112 can receive feedback to determine whether the action data structure successfully controlled the network connected device 106. The feedback can be in the form of direct feedback or indirect feedback. Direct feedback can include the user stating "no, that is not correct" or "stop" or "undo". Indirect feedback can include, for example, the user manually adjusting the network connected device 106 in response to the action data structure failing to adjust the network connected device 106 in the desired, or providing a second input audio signal that repeats the same instructions.

The orchestrator component 112 can use the machine learning model or algorithm to determine the threshold for signal processing. The orchestrator component 112 can store the threshold in the centralized account data structure 118 in the memory (e.g., data repository 116), or in a local memory of the digital assistant computing device 104.

The orchestrator component 112 can determine the threshold to use based on the machine learning model generated based on one or more of historical indications as to whether the digital assistant computing device was operational to process input audio signals, device characteristics (e.g., microphone quality or number of microphones, processor speed, available memory), current configuration (e.g., software version, whether connected to power outlet or running on battery), and creating an action data structure that successfully controls the network connected device 106 in a manner desired by the end user that provided the input audio signal. For example, if the SNR threshold was previously set at −15 dB, and the feedback received was positive, then the orchestrator component 112 can determine to keep the threshold at −15 dB or further lower the SNR thresholds to −16 dB. In another example, if the SNR threshold was previously −15 dB, and the feedback was negative, then then the orchestrator component 112 can increase the minimum threshold from −15 dB to −12 dB, for example. In some cases, the orchestrator component 112 can set the threshold for a specific digital assistant computing device 104 based on aggregated data from multiple digital assistant computing devices 104 associated with multiple accounts.

Upon selecting one of the one or more digital assistant computing devices 104 to select as the primary signal processor, the orchestrator component 112 can instruct one of the first digital assistant computing devices 104 to process the input signal, and the one or more other digital assistant computing devices 104 that received the same input signal and transmitted an indication to enter a standby mode. For example, the orchestrator component 112 can instruct the first digital assistant computing device 104 to process the input audio signal. The orchestrator component 112 can further instruct the second digital assistant computing device 104 to enter a standby mode to prevent the second digital assistant computing device 104 from processing the input audio signal.

The first digital assistant computing device 104, upon receiving the instruction to process the input audio signal, can proceed with downstream process of the input audio signal and generate data packets based on the input audio signal. The pre-processor 134 can be configured to detect a keyword and perform an action based on the keyword. The pre-processor 134 can filter out one or more terms or modify the terms prior to transmitting the terms to the data processing system 102 for further processing. The pre-processor 134 can convert the analog audio signals detected by the microphone into a digital audio signal, and transmit one or more data packets carrying the digital audio signal to the data processing system 102 via the network 105. In some cases, the pre-processor 134 can transmit data packets carrying some or all of the input audio signal responsive to detecting an instruction to perform such transmission. The instruction can include, for example, a trigger keyword or other keyword or approval to transmit data packets comprising the input audio signal to the data processing system 102. In some cases, the pre-processor 134 can filter out certain terms, such as a hot word "okay device" or "hey device" or "device" prior to sending the remaining audio signal to the data processing system. In some cases, the pre-processor 134 can filter out additional terms or generate keywords to transmit to the data processing system for further processing. The pre-processor 134 can generate the data packets that can include a command to control a network connected device 106, and transmit the data packets to the data processing system 102.

Thus, by having only one of the digital assistant computing devices 104 perform the further processing to filter and convert the input audio signal into data packets, the orchestrator component 112 can coordinate signal processing to reduce computing processing in the system 100. The data processing system 102 (e.g., the NLP component 110 and direct action API 114) can receive the data packets comprising a command from the first digital assistant computing device. The data processing system 102 can generate an action data structure based on the command, and transmit the action data structure to the network connected device to control the network connected device.

For example, the data processing system 102 can execute or run the NLP component 110 to receive or obtain the data packets generated based on the audio signal and parse the data packets. For example, the NLP component 110 can provide for interactions between a human and a computer. The NLP component 110 can be configured with techniques for understanding natural language and allowing the data processing system 102 to derive meaning from human or natural language input. The NLP component 110 can include or be configured with a speech recognition technique based on machine learning, such as statistical machine learning. The NLP component 110 can utilize decision trees, statistical models, or probabilistic models to parse the input audio signal. The NLP component 110 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

In some cases, the pre-processor 134 can convert the input audio signal into recognizable text. For example, the pre-processor 134 can include one or more functionality of the NLP component 110. In some cases, the data processing system 102 (e.g., via the NLP component 110) converts the audio input signal carried by the data packets into recognized text by comparing the input signal against a stored, representative set of audio waveforms (e.g., in the data repository 116) and choosing the closest matches. The set of audio waveforms can be stored in data repository 116 or other database accessible to the data processing system 102. The representative waveforms are generated across a large set of users, and then may be augmented with speech samples from the user. After the audio signal is converted into recognized text, the NLP component 110 matches the text to words that are associated, for example via training across users or through manual specification, with actions that the data processing system 102 can serve.

The NLP component 110 can obtain the data packets carrying the input audio signal. From the input audio signal, the NLP component 110 can identify at least one request or at least one trigger keyword corresponding to the request. The request can indicate intent or subject matter of the input audio signal. The trigger keyword can indicate a type of action likely to be taken. For example, the NLP component 110 can parse the data packets to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 110 can parse the input audio signal (or data packets carrying the input audio signal) to identify, determine, retrieve, or otherwise obtain the request and the trigger keyword. For instance, the NLP component 110 can apply a semantic processing technique to the input audio signal to identify the trigger keyword or the request. The NLP component 110 can apply the semantic processing technique to the input audio signal to identify a trigger phrase that includes one or more trigger keywords, such as a first trigger keyword and a second trigger keyword. For example, the input audio signal can include the sentence "turn off the digital lamp", "turn up the temperature in the living room", "play my study playlist on the speaker", or "I need someone to do my laundry and my dry cleaning." The NLP component 110 can apply a semantic processing technique, or other natural language processing technique, to the data packets comprising the sentence to identify trigger phrases. Trigger phrases can include, for example, "turn up the temperature", "play", "turn off", "do my laundry" or "do my dry cleaning". The NLP component 110 can further identify multiple trigger keywords, such as laundry, and dry cleaning. For example, the NLP component 110 can determine that the trigger phrase includes the trigger keyword and a second trigger keyword.

The NLP component 110 can filter the input audio signal to identify the trigger keyword. For example, the data packets carrying the input audio signal can include "It would be great if I could get someone that could help me go to the airport", in which case the NLP component 110 can filter out one or more terms as follows: "it", "would", "be", "great", "if", "I", "could", "get", "someone", "that", "could", or "help". By filtering out these terms, the NLP component 110 may more accurately and reliably identify the trigger key-words, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 110 can determine this is a request for a laundry service and a dry cleaning service. The NLP component 110 can determine this is a single request for a service provider that can provide both laundry services and dry cleaning services. The NLP component 110 can determine that this is two requests: a first request for a service provider that performs laundry services, and a second request for a service provider that provides dry cleaning services. In some cases, the NLP component 110 can combine the multiple determined requests into a single request, and transmit the single request to a third-party device 146. In some cases, the NLP component 110 can transmit the individual requests to another service provider device, or separately transmit both requests to the same third-party device 146.

The data processing system 102 can include a direct action API 114 designed and constructed to generate, based on the trigger keyword, an action data structure responsive to the request. Processors of the data processing system 102 can invoke the direct action API 114 to execute scripts that generate a data structure to provide to a network connected device 106 or other service provider to order a service or product, such as a car from a car share service. The direct action API 114 can obtain data from the data repository 116, as well as data received with end user consent from the digital assistant computing device 104 to determine location, time, user accounts, logistical or other information to allow the network connected device 106 or other third-party device to perform an operation, such as reserve a car from the car share service. Using the direct action API 114, the data processing system 102 can also communicate with the third-party device to complete the conversion by in this example making the car share pick up reservation.

The direct action API 114 can execute code or a dialog script that identifies the parameters required to fulfill a user request. Such code can look-up additional information, e.g., in the data repository 116, such as the name of a home automation service, label of a network connected device 106, or third-party service, or it can provide audio output for rendering at the digital assistant computing device 104 to ask the end user questions such as the intended control of a network connected device 106, or a destination of a requested taxi. The direct action API 114 can determine parameters and can package the information into an action data structure, which can be transmitted to the network connected device 106 as a control instruction.

The direct action API 114 can receive an instruction or command from the NLP component 110, or other component of the data processing system 102, to generate or construct the action data structure. The direct action API 114 can determine a type of action in order to select a template from the template repository 124 stored in the data repository 116. Types of actions can include control actions associated with network connected devices 106, such as adjusting a thermostat, light intensity, play music on a speaker, play video on a television, control a kitchen appliance (e.g., coffee maker, electric kettle, oven, microwave, fridge, stove, robotic vacuum cleaner), start an automobile, or adjust the thermostat in the automobile. Types of actions can include, for example, services, products, reservations, or tickets. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 110 can parse the data packets generated based on the input audio signal to identify a request and a trigger keyword corresponding to the request, and provide the request and trigger keyword to the direction action API 116 to cause the direct action API to generate, based on the trigger keyword and the account 118, an action data structure. The direct action API 114 can use the account 118 to identify network connected devices 106 that are linked to the account identifier.

The direct action API 114, upon identifying the type of request, can access the corresponding template from the template repository 124. Templates can include fields in a structured data set that can be populated by the direct action API 114 to further the operation that is requested via input audio detected by the digital assistant computing device 104 of the third-party device 146 (such as the operation of sending a taxi to pick up an end user at a pickup location and transport the end user to a destination location). The direct action API 114 can perform a lookup in the template repository 124 to select the template that matches one or more characteristic of the trigger keyword and request. For example, if the request corresponds to controlling a network connected device 106 such as a thermostat, the data processing system 102 can select a thermostat template that can include one or more of the following fields: unique device identifier and new temperature value. In another example, if the request corresponds to a request for a car or ride to a destination, the data processing system 102 can select a car sharing service template. The car sharing service template can include one or more of the following fields: device identifier, pick up location, destination location, number of passengers, or type of service.

The direct action API 114 can populate the fields with values. To populate the fields with values, the direct action API 114 can ping, poll or otherwise obtain information from one or more sensors 128 of the digital assistant computing device 104, a user interface of the device 104, a corresponding network connected device 106, or the data repository 116. For example, the direct action API 114 can detect the source location using a location sensor, such as a GPS sensor. The direct action API 114 can obtain further information by submitting a survey, prompt, or query to the end of user of the digital assistant computing device 104. The direct action API 114 can submit the survey, prompt, or query via interface 108 of the data processing system 102 and a user interface of the digital assistant computing device 104 (e.g., audio interface, voice-based user interface, display, or touch screen). Thus, the direct action API 114 can select a template for the action data structure based on the trigger keyword or the request, populate one or more fields in the template with information detected by one or more sensors 128 or obtained via a user interface, and generate, create or otherwise construct the action data structure to facilitate performance of an operation by the third-party device or a network connected device 106.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 116.

The data processing system 102 (e.g., via the direct action API 114 or interface 108) can transmit the action data structure to the corresponding network connected device 106. Thus, while multiple digital assistant computing devices 104 can detect the input audio signal from a user and generate data packets with a command to control the network connected device 106, the data processing system 102 can instruct a single digital assistant computing device 104 to perform further processing to generate data packets, and the data processing system 102 can generate and transmit the action data structure to the network connected device 106 via network 105. The data processing system 102 can bypass the one or more digital assistant computing devices 104 when transmitting the action data structure to the network connected device 106. The data processing system 102 can bypass the first and second digital assistant computing devices 104, and transmit the action data structure directly to the network connected device 106 via network 105. The data processing system 102 can bypass at least the first digital assistant computing device 104 and transmit the action data structure to the network connected device 106 without transmitting the action data structure to the first digital assistant computing device 104, or otherwise communicating with the first digital assistant computing device 104. The data processing system 102 may not communicate with the first digital assistant computing device 104 subsequent to generating the action data structure, and until the action data structure has been transmitted to the network connected device 106.

The data processing system 102 can provide a status update to the first digital assistant computing device 104 that generated the commands. The status update can indicate that the action data structure was generated and transmitted to the network connected device 106. The status update can indicate the action data structure is about to be executed by the network connected device 106, is currently being executed by the network connected device 106, a percent completion of the action data structure, or that the action data structure was just completed by the network connected device 106. The status update can indicate an error or failure associated with executing the action data structure, such as an inability to locate the network connected device 106 or a malfunction in the network connected device 106.

The first digital assistant computing device (e.g., via a pre-processor), can receive an indication of the status of the action data structure transmitted to the network connected device, and instruct the audio driver 132 to generate an output audio signal to cause a speaker component (e.g., transducer 130) to transmit an audio output corresponding to the indication of the status.

The data processing system 102 can identify the multiple digital assistant computing devices based on polling devices or based on a set up or configuration process. The data processing system can store, in a centralized account 118 in the data repository 116, a first link between the first digital assistant computing device and the network connected device, and a second link between the second digital assistant computing device and the network connected device. To generate and transmit the action data structure, the data processing system 102 can access, responsive to selection of the first digital assistant computing device and based on the first link, the centralized account 118 to retrieve information for generation of the action data structure. The centralized account 118 can include or store information associated with a multiple of heterogeneous network connected devices with links to at least one of the first digital assistant and the second digital assistant. Heterogeneous network connected devices can refer to different types of network connected devices that can have different components, software, or functionality (e.g., a networked coffee maker versus a networked robotic vacuum cleaner).

In some cases, the system 100 can include multiple network connected devices that can be capable of performing or executing the action data structure. In the event data processing system 102 (e.g., via account 118) identifies multiple network connected devices 106 that can perform or execute the action data structure, the orchestrator component 112 can select one of the network connected devices 106. The orchestrator component 112 can use a policy to select a network connected device 106 to execute the action data structure. The policy can be based on a characteristic or configuration of the network connected device. The orchestrator component 112 can poll the available network connected devices 106 linked to the account, and identify the characteristic (e.g., available input/output interfaces, battery, plugged in to power, processor speed, available memory, or proximity to digital assistant computing device that detected the input audio signal.

To select the network connected device 106 to execute the action data structure, the orchestrator component 112 can use a machine learning model from the model data structure 122. The machine learning model can include information about characteristics or features of the network connected devices 106 and feedback associated with the devices 106. Feedback can indicate whether the device 106 successfully executed the action data structure. In the event of a tie, certain types of network connected devices 106 can be ranked higher than others, as illustrated in Table 1, and the data processing system can select a higher ranked device 106 to execute the action data structure.

The data processing system 102 can select the network connected device from a plurality of network connected devices based on a comparison of a characteristic associated with the input audio signal as it is detected by respective digital assistant computing devices. For example, the data processing system can identify, determine, compute or calculate a first value of a characteristic (or parameter or metric) of the input audio signal as detected by a sensor of the first digital assistant computing device. The data processing system 102 can identify, determine, compute or calculate a second value of the characteristic (or parameter or metric) of the input audio signal as detected by a sensor of the second digital assistant computing device. The data processing system 102 can compare the first value with the second value. The data processing system can select a network connected device from a plurality of network connected devices based on the comparison.

The characteristic (or metric or parameter) of the input audio signal can include one or more characteristics of sound. The characteristic can include, for example, volume, amplitude, sound pressure, intensity, loudness, frequency, wavelength, pitch, speed, or direction. The value of the characteristic can be measured in decibels ("dB") for volume, amplitude or intensity, for example. The value of the characteristic can be measured in Hertz (e.g., 1/seconds) for frequency, for example. The value of the characteristic can be measured in units of distance (e.g., meter or centimeters) for wavelength, for example.

If the characteristic is direction, the value can include a horizontal angle or vertical angle relative on a predetermined axis. To determine the direction, the digital assistant computing device 104 (or data processing system 102) can perform acoustic source location. Acoustic source location can include locating a sound source (e.g., the source of the input audio signal such as a user) given measurements of a sound field, which can include characteristics such as sound pressure or particle velocity. Particle velocity can be measured as a vector, which can provide a source direction. The digital assistant computing device 104 or data processing system 102 can also determine the direction using multiple sensors and determining a time lag between when the sensors detect the input audio signal (e.g., a time difference of arrival of the input audio signal; triangulation). The data processing system can determine a direction by comparing values of characteristics computed from multiple sensors at different locations. The data processing system can determine a direction or perform sound localization based on a ratio of the direct and echo path lengths of the sound waves transmitted by a speaker (e.g., the user).

Figure 2:
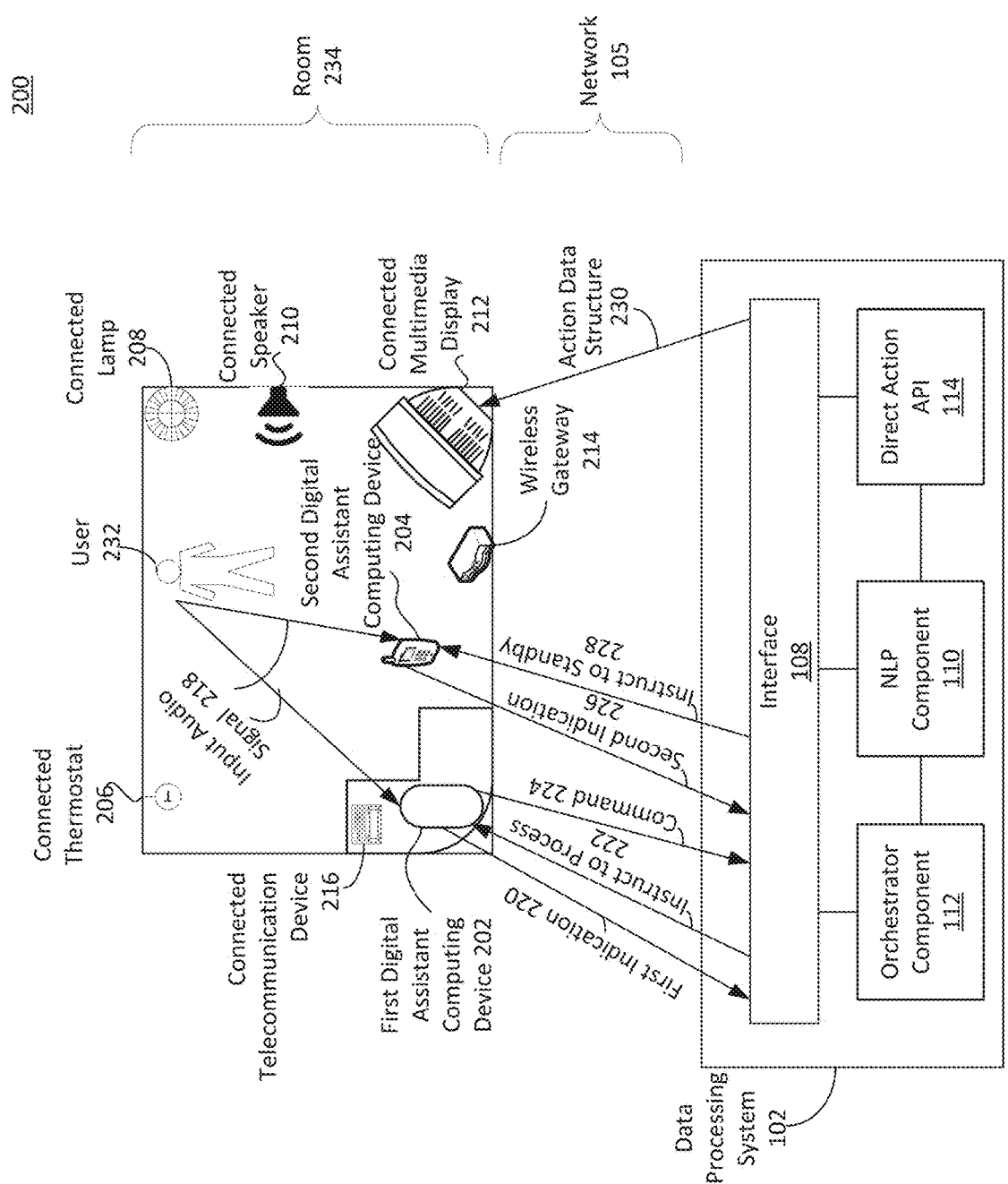
FIG. 2 is an illustration of an operation of a system to coordinate signal processing among computing devices in a voice-driven computing environment.

For example, the input audio signal can include a command to "turn off the light." The input audio signal may not provide a unique identifier for a network connected device (e.g., the room 234 depicted in FIG. 2 can include multiple connected lamps 208 located throughout the room). Due to the ambiguity in the command, the data processing system can apply a policy, model, machine learning, or other technique to select one or more connected lamps 208 from a plurality of connected lamps 208. For example, if there are multiple digital assistant computing devices located in room 234, then the data processing system can determine which digital assistant computing device is located closer to the user based on the amplitude of the input audio signal as detected by the different digital assistant computing devices. The data processing system can determine that the digital assistant computing device that detected the input audio signal with the highest amplitude is the digital assistant computing device closets to the user. The data processing system can then identify the connected lamp 208 that is located closest to the selected digital assistant computing device. The data processing system can then determine to control the connected lamp 208 that is located closest to the digital assistant computing device that is closest to the user.

In another example, the data processing system 102 can determine the direction of the sound. The data processing system 102 can use the direction of the sound to identify a network connected device 106. For example, if there are three network connected devices 106 located in the room, the user may face the network connected device 106 they desire to control, and then speak the command. The network connected devices 106 can include a microphone to detect the volume of the sound. However, the network connected device 106 may or may not include a processor to parse the input audio signal, convert them to data packets, or perform any natural language process. The network connected devices 106 can include minimal signal processing circuitry that can measure the amplitude of the input audio signal, and provide the indication to the data processing system 102. Thus, if each of the network connected devices 106 measured the amplitude of the input audio signal, and provided the amplitude value to the data processing system 102, the data processing system 102 can select the network connected device that detected the input audio signal with the highest amplitude.

The data processing system 102 (e.g., via the orchestrator component 112) can select the network connected device 106 from a plurality of network connected devices 106 based on the location of the speaker (e.g., user providing the input audio signal). The data processing system 102 can determine to select one or more network connected devices 106 located in the same room as the speaker that are capable of executing the command provided in the input audio signals. The data processing system 102 can determine to select one or more network connected devices 106 within a distance (or radius) of the speaker. The distance can be predetermined, fixed, selected based on the command, selected based on the type of network connected device 106, or dynamically determined based on a characteristic of the input audio signal (e.g., smaller radius if the input audio signal has low amplitude less than a threshold, such as a whisper, and longer radius if the input audio signal has a high amplitude greater than a threshold). For example, if the speaker yells to turn off the light, the data processing system 102 can turn off all lights in the entire house. If the speaker uses a normal voice to speak turn off the light, the data processing system 102 can determine to turn off all the lights in the same room as the speaker. If the user whispers to turn off the light, the data processing system 102 can turn off just the light closest to the speaker or user (e.g., a table lamp on a nightstand).

The data processing system 102 can select the network connected device 106 from a plurality of network connected devices 106 configured to execute the command using semantic analysis. The data processing system 102 can identify contextual information in the input audio signal to determine the network connected device 106 to select. For example, the input audio signal can include an identifier, even if not a unique identifier, of the desired network connected device to execute the command. For example, the identifier can be "lower the light". The data processing system 102 can determine (e.g., by polling the network connected devices 106 for status information) that while there may be multiple connected lamps 208 located in the room 234, that only a subset of the connected lamps 208 are capable of dimming the output light intensity. Thus, the data processing system 102 can first filter out the non-dimmable lamps. Of the remaining lamps that are capable of being dimmed, the data processing system 102 can determine the current output intensity level of each lamp. The data processing system 102 can then determine that only one of the dimmable lamps is capable of being dimmed less. Accordingly, by process of elimination, the data processing system 102 can identify the connected network device 106 the speaker desired to control.

Other indications can include, for example, providing contextual information associated with the network connected device 106 the speaker desired to control. For example, the command can be "turn off the light next to the television". The data processing system 102 can determine which connected lamps 208 are near the television (e.g., connected multimedia display 212). For example, the data processing system 102 can determine that the lamp 208 is near the connected multimedia display 212 based a proximity sensor, settings, analyzing speaker output, or responses to prompts.

The data processing system 102 can determine the network connected device 106 to select from a plurality of network connected devices 106 configured to execute the command based on machine learning model. The data processing system 102 can use input values (e.g., features or characteristics associated with the input audio signal or context surrounding the provision of the input audio signal) and corresponding output values (e.g., which network connected device 106 is selected) to generate the model. The data processing system 102 can generate a machine learning model based on features associated with the input audio signal. The data processing system 102 can generate the model based on feedback. Features can include the characteristics of the input audio signal, time of day, day of week, status of other connected devices 106 in the room 234 (e.g., is the speaker 210 playing music at what volume and what type of music; is the television 212 on; or is the user using the connected telecommunication device 216 to make a phone call). Feedback can include feedback indicating the correct network connected device was selected, or feedback indicating the incorrect network connected device was selected. The data processing system 102 can input the features into a model and correlate the features with which network connected device 106 the speaker identified or determined to control historically. For example, at 6 AM in the morning, the speaker can provide a command "turn on the lamp on the left nightstand". The following day, the speaker can provide, at 6 AM, the command "turn on the lamp". The data processing system 102 can determine based on the previous lamp-related command received at 6 AM, that that speaker desired to turn on the lamp on the left nightstand at 6 AM. The data processing system 102 can predict that it is likely that the command "turn on the lamp" provided at or around (e.g., plus or minus 1 minute, 2 minutes, 5 minutes, 10 minutes, 20 minutes) 6 AM refers to the command "turn on the lamp on the left nightstand." Accordingly, the data processing system 102 can select the same network connected device 106, and generate an action data structure for the selected network connected device 106. The data processing system 102 can also use information from other sensors, such as ambient light sensor, to determine which room is dark and turn the lights in that room.

FIG. 2 is an illustration of the operation of a system to orchestrate signal processing among computing devices in a voice-driven computing environment. The system 200 can include one or more component of system 100 depicted in FIG. 1 or system 400 depicted in FIG. 4. The system 200 can include multiple digital assistant computing devices 202 and 204 located in a room 234. The room 234 can include any type or size of physical space, including, for example, a living room, bedroom, kitchen, dining room, basement, office, lobby, mall, retail store, restaurant, park, outdoor space, automobile, or motorhome. The first digital assistant computing device 202 can include one or more component or functionality of the digital assistant computing device 104 depicted in FIG. 1. The first digital assistant computing device 202 can include a speaker device or a dedicated digital assistant computing device. The second digital assistant computing device 204 can include one or more component or functionality of the digital assistant computing device 104 depicted in FIG. 1. The second digital assistant computing device 204 can include a smartphone that executes a digital assistant application. The first and second digital assistant computing devices 204 can be linked to a central account having a unique identifier and associated with user 232.

The system 200 can include multiple network connected devices 106 located in the room 234, such as a connected telecommunication device 216 (e.g., connected telephone), a connected thermostat 206, connected lamp 208, connected speaker 210 (or sound system), or connected multimedia display 212 (or smart television). The internet connected devices can be located external or remote from the room 234, while still being controllable via digital assistant computing devices 202 or 204 via data processing system 102. The internet connected devices 206, 208, 210, 212, or 216 can connect to network 105 via a wireless gateway 214 (e.g., network router, wireless router, or modem), which can provide access to network 105. The internet connected devices 206, 208, 210, 212 or 216 can be monitored, managed, or controlled via data processing system 102. In some cases, the internet connected devices 206, 208, 210, 212 or 216 can be monitored, managed, or controlled by the first or second digital assistant computing devices 202 or 204 via the data processing system 102. The internet connected devices 206, 208, 210, 212 or 216 can be linked to the central account having the unique identifier, which can be linked to user 232.

At ACT 218, a user 232 located in the room 234 can speak a command or query. The user can generate acoustic waves corresponding to an input audio signal. At ACT 218, the input audio signal can be detected by both the first digital assistant computing device 202 and the second digital assistant computing device 204. An example input audio signal 218 can include a command "play today's news clips on the television". Both devices 202 and 204 can detect the input audio signal at ACT 218 because both devices 202 and 204 are located within detection proximity of the user 232. Both devices can be configured to listen for input audio signals and process the input audio signals.

The first and second digital computing devices 202 and 204 can perform initial processing on the input audio signal and determine that the input audio signal was detected with sufficient quality such that the digital computing devices 202 and 204 can each generate data packets that can likely be used to generate an action data structure to successfully control a network connected device in the room 232. Initial processing can refer to or include a signal quality check process.

At ACT 220, the first digital assistant computing device 220 can transmit, to an orchestrator component 112 of a data processing system 102, a first indication that the first digital assistant computing device 220 is operational to process the input audio signal 218. The first indication can be generated responsive to a signal quality check process. At ACT 222, the orchestrator component 112 can determine, based on a policy, to instruct the first digital assistant computing device 202 to process the input audio signal 218.

At ACT 226, the data processing system 102 receives a second indication from the second digital assistant computing device 204 indicating that the second digital assistant computing device 204 is operational to process the input audio signal. However, to reduce processing in the system 200, the data processing system 102 (e.g., via orchestrator component 112), can instruct the second digital assistant computing device to enter a standby mode at ACT 228. Standby mode can refer or instruct the device 204 to not further process the current input audio signal 218. Standby mode can refer or instruct the device 204 to not further process subsequent input audio signals until a condition has been or an event is triggered. Standby mode can cause the device 204 to not generate data packets. In standby mode, the device 204 may or may not perform the signal quality check on subsequent input audio signals and transmit indications to the data processing system 102. Standby mode can disable one or more components or functionality of the device 204.

The device 204 can be instructed (via 228) to enter standby mode for a predetermined time interval (e.g., 1 minute, 2 minutes, 3 minutes, 5 minutes, 10 minutes, 15 minutes, or 30 minutes). The device 204 can be instructed (via 228) to enter standby mode until the device 204 moves or changes location, such as outside a virtual geographical fence established around room 232.

At ACT 224, the first digital assistant computing device 202, responsive to the instruction at ACT 222, can perform downstream processing of the input audio signal 218 and provide data packets carrying a command. At ACT 224, the first digital assistant computing device 202 can transmit the data packets carrying the command to the data processing system 102. The NLP component 110 and direct action API 114 can process the data packets to create an action data structure, and transmit the action data structure at ACT 230 to the corresponding networked computing device. For example, the data processing system 102 can identify trigger keywords "play", "television" and "news clips". The data processing system 102 can perform a lookup in an account data structure 118 stored in data repository 116 to identify the connected multimedia display 212 linked to the account having a unique identifier. The data processing system 102 can determine that "television" corresponds to "connected multimedia display 212" (e.g., based on historic use or by process of elimination). The data processing system 102 can identify news clips using a content selector or performing a query on a video platform for news clips. The data processing system 102 can generate an action data structure with a link or pointer to news clips, and transmit the action data structure to the connected multimedia display 212 to cause the connected multimedia display 212 to render or play the news clips. The data processing system 102 can bypass the one or more digital assistant computing devices 104 when transmitting the action data structure to the network connected device 106. The data processing system 102 can bypass the first and second digital assistant computing devices 104, and transmit the action data structure directly to the network connected device 106 via network 105. The data processing system 102 can bypass at least the first digital assistant computing device 104 and transmit the action data structure to the network connected device 106 without transmitting the action data structure to the first digital assistant computing device 104, or otherwise communicating with the first digital assistant computing device 104. The data processing system 102 may not communicate with the first digital assistant computing device 104 subsequent to generating the action data structure, and until the action data structure has been transmitted to the network connected device 106.

The data processing system 102 can provide a status update to the first digital assistant computing device 202 that generated the commands. The status update can indicate that the action data structure was generated and transmitted to the display 212. The status update can indicate that news clips are about to be played, are being played, or just completed playing on the display 212. The status update might indicate an error or failure associated with executing the action data structure, such as an inability to locate the display 212 due to an absence of a linked display in the account.

The first digital assistant computing device (e.g., via a pre-processor), can receive an indication of the status of the action data structure transmitted to the network connected device, and instruct an audio driver to generate an output audio signal to cause a speaker component to transmit an audio output corresponding to the indication of the status.

Thus, the orchestrator component 112 can coordinate signal processing to reduce resource utilization in the system 200 so not every digital assistant computing device 202 or 204 processes the input audio signal to generate data packets with a grammar to send to the data processing system, and not ever network connected device receives the action data structure to execute the action data structure.

Figure 3:
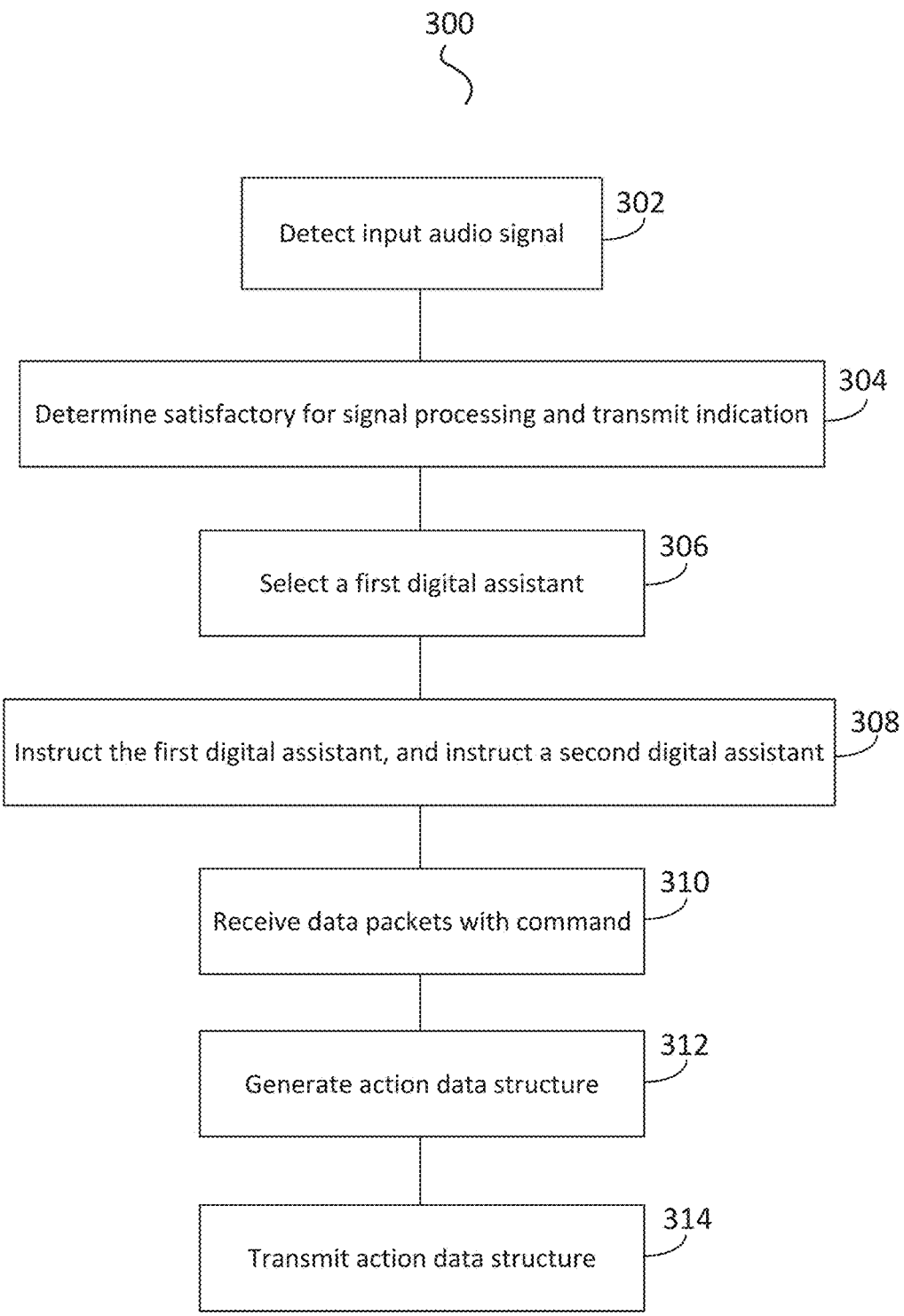
FIG. 3 is an illustration of a method of coordinating signal processing among computing devices in a voice-driven computing environment.

FIG. 3 is an illustration of an example method of orchestrating signal processing among computing devices in a voice-driven computing environment. The method 300 can be performed by one or more component, system or element of system 100 depicted in FIG. 1, system 200 depicted in FIG. 2, or system 400 depicted in FIG. 4. The method 300 can include detecting an input audio signal at ACT 302. The input audio signal can be detected by one or more digital assistant computing devices. For example, a first and second digital assistant computing device can each detect the same input audio signal at ACT 302.

At ACT 304, the method 300 can include determining whether the detected input signal is satisfactory for signal processing and transmit an indication. The one or more digital assistant computing device can perform a signal quality check process to determine if the detected input audio signal is of sufficient quality for reliable downstream processing. For example, the first digital assistant computing device can determine the SNR of the detected input audio signal, and determine the SNR satisfies a threshold (e.g., greater than or equal to −3 dB). The second digital assistant computing device can determine that the SNR of the detected input audio signal detected by the second digital assistant computing device also satisfies the threshold. The first and second digital assistant computing devices can transmit respective indications to the data processing system that indicate that the devices are operational to process the detected input audio signal because the quality of the detected input audio signal satisfies a signal quality check. In some cases, only one of the one or more digital assistant computing devices may detect the input audio signal with sufficient quality to pass the signal quality check.

At ACT 306, the data processing system can select one of the digital assistant computing devices for further processing. For example, the data processing system can select a first digital assistant computing device to perform further processing. The data processing system can select the first digital assistant computing device based on the first digital assistant computing device being established as the primary signal processor. For example, both the first and second digital assistant computing devices can be operational to process the input audio signal, but the data processing system can select one of the digital assistant computing devices based on the digital assistant computing device being set as a primary signal processor.

At ACT 308, the data processing system can instruct the first digital assistant to perform the further processing, and instruct the second digital assistant computing device to enter a standby mode or not perform further processing. Standby mode can refer to not processing the current input audio signal.

At ACT 310, the data processing system can receive data packets with a command. The data packets can be generated by the selected first computing device. At ACT 312, the data processing system can select a network connected device from a plurality of network connected devices, and generate an action data structure for the selected network connected device based on the data packets. The action data structure can be generated with instructions to control the selected network connected device. The data processing system can select the network connected device using one or more policies, characteristics, machine learning techniques, heuristics, or rules. At ACT 314, the data processing system can transmit the action data structure to the selected network connected device.

Figure 4:
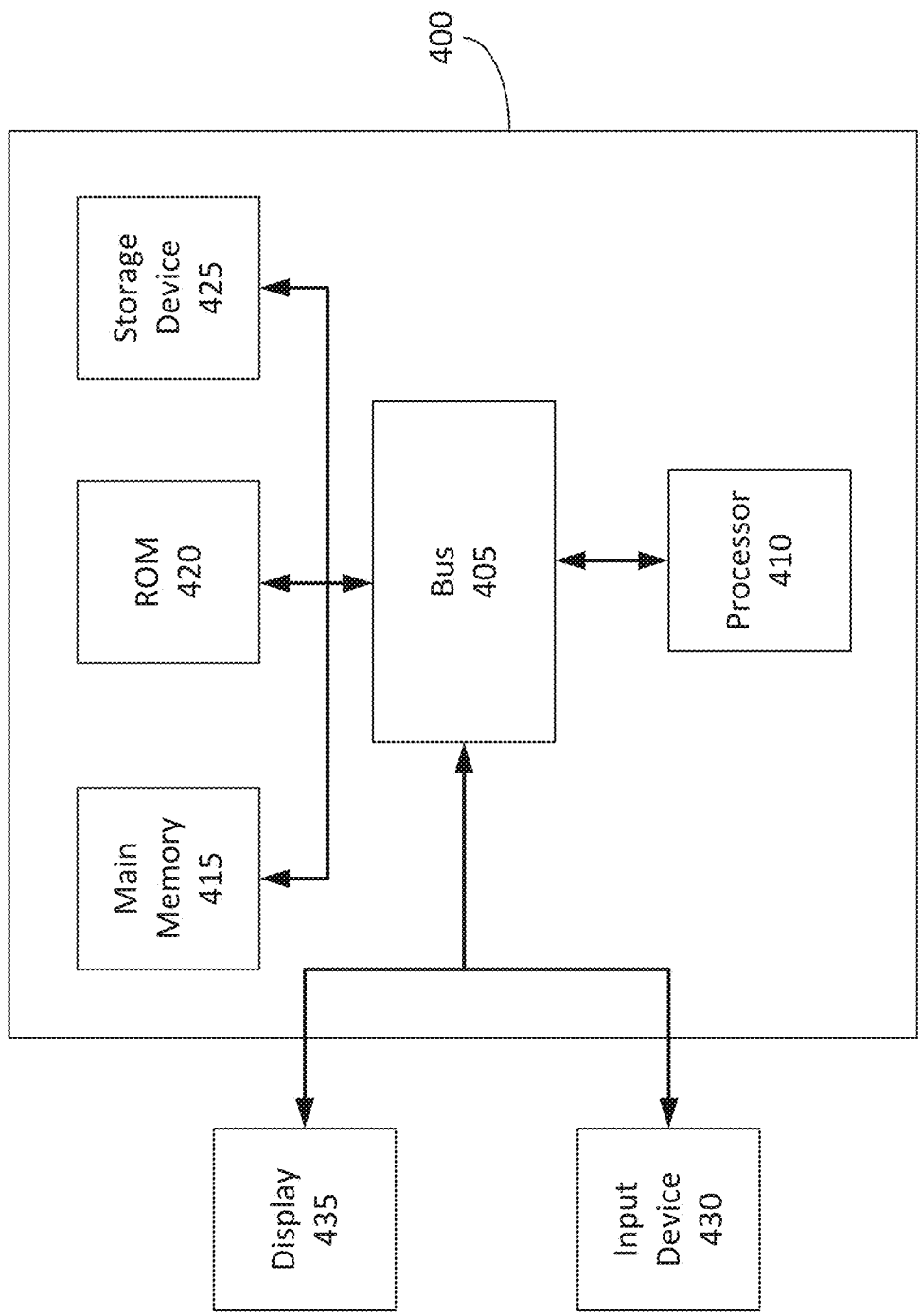
FIG. 4 is a block diagram illustrating a general architecture for a computer system that can be employed to implement elements of the systems and methods described and illustrated herein.

FIG. 4 is a block diagram of an example computer system 400. The computer system or computing device 400 can include or be used to implement the system 100, or its components such as the data processing system 102. The computing device 400 can include, provide, or interface with, an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 150 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415.

Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 114, content selector component 118, or NLP component 110 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the digital assistant computing device 104 or the content provider computing device 106 or the third-party device 146).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 110 or the content selector component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system, comprising:
   a data processing system comprising one or more processors and memory to:
   identify a plurality of digital assistant devices associated with an electronic account, the plurality of digital assistant devices comprising a first digital assistant device and a second digital assistant device;
   determine, based on a machine learning model, to set the first digital assistant device as the primary signal processor and the second digital assistant device as the secondary signal processor;
   receive an indication from the first digital assistant device that the first digital assistant device detected, via a sensor of the first digital assistant device, an input audio signal and that the first digital assistant device is operational to process the input audio signal;
   receive an indication from the second digital assistant device that the second digital assistant device detected, via a sensor of the second digital assistant device, the input audio signal and that the second digital assistant device is operational to process the input audio signal;
   select, based on the first digital assistant device set as the primary signal processor, the first digital assistant device to process the input audio signal, wherein both the first digital assistant device and the second digital assistant device are operational to process the input audio signal;
   instruct, responsive to selection of the first digital assistant device set as the primary signal processor, the first digital assistant device to process the input audio signal; and instruct, responsive to the second digital assistant set as the secondary signal processor, the second digital assistant device to enter a standby mode to prevent the second digital assistant device from processing the input audio signal.

2. The system of claim 1, wherein the plurality of digital assistant devices are configured to control a plurality of network connected devices responsive to one or more input audio signals.

3. The system of claim 1, comprising:
the data processing system to receive, responsive to the instruction to the first digital assistant device to process the input audio signal, data packets comprising a command from the first digital assistant device generated by the first digital assistant device based on the input audio signal.

4. The system of claim 1, comprising the data processing system to:
receive data packets from the first digital assistant device based on the input audio signal; and
generate, for a network connected device configured to be controlled via the first digital assistant device, an action data structure based on the data packets.

5. The system of claim 4, comprising:
the data processing system to transmit the action data structure to the network connected device to control the network connected device.

6. The system of claim 4, wherein the action data structure comprises an action for at least one of adjusting a thermostat, adjusting a light intensity, or controlling an appliance.

7. The system of claim 1, wherein the plurality of digital assistant devices are heterogeneous devices, the first digital assistant device comprising a first type of device, and the second digital assistant device comprising a second type of device different from the first type of device.

8. The system of claim 7, wherein the first digital assistant device and the second digital assistant device are each configured with an assistant software development kit, and the first type of device comprises at least one of a speaker device, a television device, a mobile device, and a wearable device.

9. The system of claim 1, comprising the data processing system to:
determine, based on a comparison of one or more characteristics of the first digital assistant device and one or more characteristics of the second digital assistant device, to set the first digital assistant device as the primary signal processor, and set the second digital assistant device as the secondary signal processor; and
set the first digital assistant device as the primary signal processor, and set the second digital assistant device as the secondary signal processor.

10. The system of claim 1, wherein the primary signal processor is determined based on a threshold signal-to-noise ratio (SNR), and wherein the threshold SNR is determined by the machine learning model.

11. The system of claim 2, wherein the threshold SNR is customized based on characteristics of the first digital assistant device and the second digital assistant device.

12. A method, comprising:
identifying, by a data processing system comprising one or more processors and memory, a plurality of digital assistant devices associated with an electronic account, the plurality of digital assistant devices comprising a first digital assistant device and a second digital assistant device;
determining, based on a machine learning model, to set the first digital assistant device as the primary signal processor and the second digital assistant device as the secondary signal processor;
receiving, by the data processing system, an indication from the first digital assistant device that the first digital assistant device detected, via a sensor of the first digital assistant device, an input audio signal and that the first digital assistant device is operational to process the input audio signal;
receiving, by the data processing system, an indication from the second digital assistant device that the second digital assistant device detected, via a sensor of the second digital assistant device, the input audio signal and that the second digital assistant device is operational to process the input audio signal;
selecting, by the data processing system based on the first digital assistant device set as the primary signal processor, the first digital assistant device to process the input audio signal, wherein both the first digital assistant device and the second digital assistant device are operational to process the input audio signal;
instructing, by the data processing system responsive to selection of the first digital assistant device set as the primary signal processor, the first digital assistant device to process the input audio signal; and
instructing, by the data processing system responsive to the second digital assistant set as the secondary signal processor, the second digital assistant device to enter a standby mode to prevent the second digital assistant device from processing the input audio signal.

13. The method of claim 12, wherein the plurality of digital assistant devices are configured to control a plurality of network connected devices responsive to one or more input audio signals.

14. The method of claim 12, comprising:
receiving, by the data processing system responsive to the instruction to the first digital assistant device to process the input audio signal, data packets comprising a command from the first digital assistant device generated by the first digital assistant device based on the input audio signal.

15. The method of claim 12, comprising:
receiving, by the data processing system, data packets from the first digital assistant device based on the input audio signal; and
generating, by the data processing system for a network connected device configured to be controlled via the first digital assistant device, an action data structure based on the data packets.

16. The method of claim 15, comprising:
transmitting, by the data processing system, the action data structure to the network connected device to control the network connected device.

17. The method of claim 15, wherein the action data structure comprises an action for at least one of adjusting a thermostat, adjusting a light intensity, playing music on a speaker, playing a video on a television, controlling an appliance, or starting an automobile.

18. The method of claim 12, wherein the plurality of digital assistant devices are heterogeneous devices, the first digital assistant device comprising a first type of device, and the second digital assistant device comprising a second type of device different from the first type of device.

19. The method of claim 18, wherein the first digital assistant device and the second digital assistant device are each configured with an assistant software development kit, and the first type of device comprises at least one of a speaker device, a television device, a mobile device, and a wearable device.

20. The method of claim 12, comprising:
- determining, by the data processing system, based on a comparison of one or more characteristics of the first digital assistant device and one or more characteristics of the second digital assistant device, to set the first digital assistant device as the primary signal processor, and set the second digital assistant device as the secondary signal processor; and
- setting, by the data processing system, the first digital assistant device as the primary signal processor, and set the second digital assistant device as the secondary signal processor.

* * * * *